United States Patent [19]

Badger

[11] E Patent Number: Re. 33,562

[45] Reissued Date of Patent: Apr. 2, 1991

[54] FUEL COMPOSITION

[75] Inventor: Stephen L. Badger, Jackson, Miss.

[73] Assignee: Alcofuels, Inc., Vicksburg, Miss.

[21] Appl. No.: 777,540

[22] Filed: Sep. 18, 1985

Related U.S. Patent Documents

Reissue of:

[64] Patent No.: 4,405,336
Issued: Sep. 20, 1983
Appl. No.: 288,418
Filed: Jul. 30, 1981

[51] Int. Cl.[5] ..... C10L 1/18

[52] U.S. Cl. ..... 44/438; 44/437; 44/439; 44/451

[58] Field of Search ..... 44/53, 56, 77

[56] References Cited

U.S. PATENT DOCUMENTS

| | | | |
|---|---|---|---|
| 1,474,983 | 11/1923 | Schreiber | 44/56 |
| 3,902,868 | 9/1975 | Zoch, Jr. | 44/56 |
| 4,129,421 | 12/1978 | Webb | 44/56 |
| 4,231,756 | 11/1980 | King | 44/56 |
| 4,265,638 | 5/1981 | Burke | 44/56 |
| 4,319,886 | 3/1982 | Gold et al. | 44/53 |

*Primary Examiner*—Jacqueline V. Howard

*Attorney, Agent, or Firm*—Hubbard, Thurman, Turner, Tucker & Harris

[57] ABSTRACT

A composition useful, inter alia, as a fuel, is based on ethyl alcohol denatured with methylisobutyl alcohol and kerosene, which is mixed with xylenes and isopropyl alcohol. The xylenes and isopropyl alcohol act with the denaturizing agents to raise the flash point above that of ethyl alcohol alone and also to mask the odor and color the flame, thus making the composition safer for use as a charcoal lighter or as a fuel for e.g. patio lamps.

7 Claims, No Drawings

FUEL COMPOSITION

Matter enclosed in heavy brackets [ ] appears in the original patent but forms no part of this reissue specification; matter printed in italics indicates the additions made by reissue.

The present invention relates to compositions, which can be used for lighting charcoal grills and trash fires, as fuel in patio torches, lanterns and liquid fueled stoves and heaters and for other purposes as described below.

It is known that alcohol constitutes an excellent base for a charcoal fires lighter, since it burns without creating smoke or noxious fumes and has good ignition capacity. Its drawback, however, is its high flammability, which can lead to a risk of injury by burning, or even explosion, if it is poured on hot, but not apparently burning, charcoal. In some cases, flashback through the air to a container held in the user's hand can occur.

Initially, these problems caused the avoidance of alcohol as the base for lighter compositions and the use, instead, of paraffin-based compositions. These, however, suffered from the drawback that paraffin burns with a dirty, smelly flame, which is particularly undesirable in the case of domestic uses, such as backyard barbecues.

An alternative solution, suggested for example in U.S. Pat. Nos. 3,801,292 and 4,238,201, is to confine the liquid alcohol, as it burns, within a solid or semi-solid mass so as to reduce the risk of explosion, or large flames. These compositions are, however, relatively expensive and less convenient to use than liquid fuels.

OBJECTS OF THE INVENTION

It is an object of the present invention to provide an alcohol based composition for fire lighting, which avoids the dangers and disadvantages described above.

It is a further object to provide such as composition which burns without unpleasant odors, yet with visible indication of its combustion.

It is yet a further object to provide such a composition in which the flash point has been raised above the 55° F. level of ethyl alcohol to reduce the risk of explosion.

SUMMARY OF THE INVENTION

Accordingly, the present invention provides a composition comprising ethyl alcohol denatured, preferably by the addition of a ketone such as methyl isobutyl ketone, and kerosene, and mixed with xylenes and isopropyl alcohol. Xylenes is a mixture of the three different isomers of xylene, ortho-, para- and metaxylene. The ketone and kerosene act primarily as denaturants, but may be added in quantities in excess of those required for that purpose alone, so as to raise the flash point of the mixture, change its odor and add color to the flame with which it burns. The xylenes and isopropyl alcohol serve to raise the flash point, to mask the odor and to make the flame more visible. The preferred range of the constituents of the composition are as follows:

| | Parts by Volume | Percent |
|---|---|---|
| Ethyl alcohol | 1.000 | 79.37–87.72 |
| Methyl isobutyl ketone | 60–90 | 5.26–7.14 |
| Kerosene | 20–50 | 1.75–3.97 |

-continued

| | Parts by Volume | Percent |
|---|---|---|
| Xylenes | 30–60 | 2.63–4.76 |
| Isopropyl alcohol | 30–60 | 2.63–4.76 |

The xylenes could be replaced by a mixture of toluene and methyl alcohol. The denaturing agent could be gasoline, or deodorized kerosene. Acetone could also be added to mask the smell of alcohol.

To prepare the composition, it has been found preferable to mix together all the constituents set out above with the exception of the ethyl alcohol and to add this pre-mixed composition to ethyl alcohol. This ensures that solution of the components in the alcohol occurs expeditiously.

Compositions embodying the invention can be treated to form a paste-like mass suitable for use as a sterno-like solid fuel. In addition to their use as a fuel, compositions embodying the invention can be used to clean paint brushes for varnish, lacquer or oil based paints.

Two examples of specific compositions embodying the invention will now be described.

EXAMPLE I

The following constituents in the following proportions are mixed; all the constituents other than the ethyl alcohol being initially premixed and the premixture then added to the ethyl alcohol.

| Constituent | Parts by Volume |
|---|---|
| Ethyl alcohol (at least 90%/180 proof) | 1000 |
| Methyl isobutyl ketone | 80 |
| Xylenes | 40 |
| Kerosene | 30 |
| Isopropyl alcohol | 60 |

EXAMPLE II

This is prepared exactly as for Example I, but the composition is as follows:

| Constituent | Parts by Volume |
|---|---|
| Ethyl alcohol (at least 90%/180 proof) | 1000 |
| Methyl isobutyl ketone | 80 |
| Xylenes | 50 |
| Kerosene | 50 |
| Isopropyl alcohol | 50 |

The composition of Example II burns with a more pronounced yellow flame than that of Example I.

I claim:

1. A composition comprising:

1000 parts by volume of at least 90%/180 proof ethyl alcohol;

60–90 parts by volume of methylisobutyl ketone;

20–50 parts by volume of kerosene;

30–60 parts by volume of xylenes, and

[20–50] *30–60* parts by volume of isopropyl alcohol.

2. A composition comprising:

1000 parts by volume of at least 90%/180 proof ethyl alcohol;

60–90 parts by volume of methylisobutyl ketone;

20–50 parts by volume of kerosene;

30–60 parts by volume of a mixture of toluene and methyl alcohol, and

20–50 parts by volume of isopropyl alcohol.

3. A composition comprising:

1000 parts by volume of at least 90%/180 proof ethyl alcohol;

60–90 parts by volume of methylisobutyl ketone;

20–50 parts by volume of gasoline;

30–60 parts by volume of xylenes, and

20–50 parts by volume of isopropyl alcohol.

4. A composition comprising:

1000 parts by volume of ethyl alcohol of at least 90%/180 proof;

about 80 parts by volume of methylisobutyl ketone;

about 40 parts by volume of xylenes;

about 30 parts by volume of kerosene, and about [50] *60* parts by volume of isopropyl alcohol.

5. A composition comprising:

1000 parts by volume of ethyl alcohol of at least 90%/180 proof;

about 80 parts by volume of methylisobutyl ketone;

about 50 parts by volume of xylenes;

about 50 parts by volume of kerosene, and 50 parts by volume of isopropyl alcohol.

*6. A composition comprising:*

*ethyl alcohol;*

*an amount of denaturizing agent present in an effective amount to denaturize said ethyl alcohol; and*

*a composition comprising xylenes and isopropyl alcohol, present in such amounts as to raise the flash point, to mask the odor and to make the flame of said ethyl alcohol upon burning more visible.*

*7. A composition as claimed in claim 6 wherein said denaturizing agent comprises ketones and kerosene.*

* * * * *